(12) United States Patent
Ansley

(10) Patent No.: US 12,495,432 B2
(45) Date of Patent: Dec. 9, 2025

(54) COORDINATED FREQUENCY USAGE IN MULTI-AP ENVIRONMENTS

(71) Applicant: Ruckus IP Holdings LLC, Claremont, NC (US)

(72) Inventor: Carol Ansley, Johns Creek, GA (US)

(73) Assignee: Ruckus IP Holdings LLC, Claremont, NC (US)

( * ) Notice: Subject to any disclaimer, the term of this patent is extended or adjusted under 35 U.S.C. 154(b) by 127 days.

(21) Appl. No.: 17/691,408

(22) Filed: Mar. 10, 2022

(65) Prior Publication Data

US 2022/0201688 A1 Jun. 23, 2022

Related U.S. Application Data

(63) Continuation of application No. 15/802,155, filed on Nov. 2, 2017, now Pat. No. 11,310,804.

(51) Int. Cl.
| | | |
|---|---|---|
| *H04W 72/52* | (2023.01) | |
| *H04W 28/02* | (2009.01) | |
| *H04W 74/00* | (2009.01) | |
| *H04W 88/08* | (2009.01) | |
| *H04W 72/27* | (2023.01) | |
| *H04W 72/53* | (2023.01) | |
| *H04W 84/12* | (2009.01) | |

(52) U.S. Cl.
CPC ....... *H04W 72/52* (2023.01); *H04W 28/0252* (2013.01); *H04W 74/006* (2013.01); *H04W 88/08* (2013.01); *H04W 28/021* (2013.01); *H04W 72/27* (2023.01); *H04W 72/53* (2023.01); *H04W 84/12* (2013.01)

(58) Field of Classification Search
USPC ........................................ 370/235
See application file for complete search history.

(56) References Cited

U.S. PATENT DOCUMENTS

| | | | | |
|---|---|---|---|---|
| 2006/0094371 A1* | 5/2006 | Nguyen | ............... | H04B 17/354 455/67.13 |
| 2015/0163769 A1* | 6/2015 | Lee | ....................... | H04W 24/02 370/329 |
| 2016/0027112 A1* | 1/2016 | Smith | ................ | G06Q 30/0645 705/37 |

(Continued)

FOREIGN PATENT DOCUMENTS

| | | |
|---|---|---|
| EP | 2 618 519 | 7/2013 |
| WO | 2016/207071 | 12/2016 |

(Continued)

OTHER PUBLICATIONS

Notification of the First Office Action dated Feb. 15, 2023 in Chinese Application No. 201880077622.0 with English translation.

(Continued)

*Primary Examiner* — Nicholas R Taylor
(74) *Attorney, Agent, or Firm* — Chernoff, Vilhauer, McClung & Stenzel, LLP

(57) ABSTRACT

Systems and methods for operating an access point in a wireless network so as to reduce congestion. The access point may have a transmitter capable of broadcasting a beacon indicating a channel over which the access point propagates wireless data. The channel broadcast by the access point may be optimized for future cooperative use of the channel with a second access point.

14 Claims, 6 Drawing Sheets

(56) References Cited

U.S. PATENT DOCUMENTS

2017/0006608 A1   1/2017   Josiam et al.
2018/0176921 A1   6/2018   Cariou

FOREIGN PATENT DOCUMENTS

| WO | 2017/005893 | 1/2017 | |
| WO | WO-2017005893 A1 * | 1/2017 | ............ H04W 16/14 |
| WO | 2017/153498 | 9/2017 | |
| WO | WO-2017153498 A1 * | 9/2017 | .............. H04W 4/08 |

OTHER PUBLICATIONS

International Search Report & Written Opinion, Re: Application No. PCT/US2018/058473, dated Jan. 24, 2019.
Communication pursuant to Article 94(3) EPC dated Mar. 24, 2022 in European Application No. 18 807 165.8.

* cited by examiner

COORDINATED FREQUENCY USAGE IN MULTI-AP ENVIRONMENTS

CROSS-REFERENCE TO RELATED APPLICATION

None.

BACKGROUND OF THE INVENTION

The subject matter of this application relates to systems and methods for selecting access point channels in a wireless network.

An access point (AP) is a device that acts as a communications link between a wireless and a wired network. Typically an access point obtains one or more clients, such as handheld devices, laptops, PCs etc. with which it establishes a wireless connection, and wirelessly relays signals from a wired network (e.g., the Internet, a business network, etc.) to its clients, wirelessly relays signals from its clients to that wired network, and wirelessly relays signals among its clients.

In order to operate as a conduit between its clients and the wired network, the AP must first choose a wireless channel over which it will communicate with clients and then it can broadcast that channel to any receiver. National regulatory agencies dictate the available RF channels in any given area. Wireless LAN technologies that operate according to a family of IEEE specifications known as 802.11, specify protocols and technologies for use in the available channels. In the United States, for example, there are up to fourteen available 20 MHz-wide channels in the 2.4 MHz band, spaced 5 MHz apart (eleven channels if orthogonal frequency division multiplexing is used), and further channels available in the 5 GHz band.

APs typically include automatic channel selection by which an access point senses the presence of other access points, and attempts to select a channel which it will be less likely to share with another access point. When multiple APs are installed within close proximity, however, these APs may have to choose overlapping channels, which causes inter-access point contention and/or interference degrading the performance of the wireless network(s) of which the APs are a part. For example, testing has shown that broadcast efficiency can be reduced to only 20% of normal throughput in such circumstances.

Therefore, improved systems and methods are desired for channel allocation among groups of APs in proximity to each other.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1A:
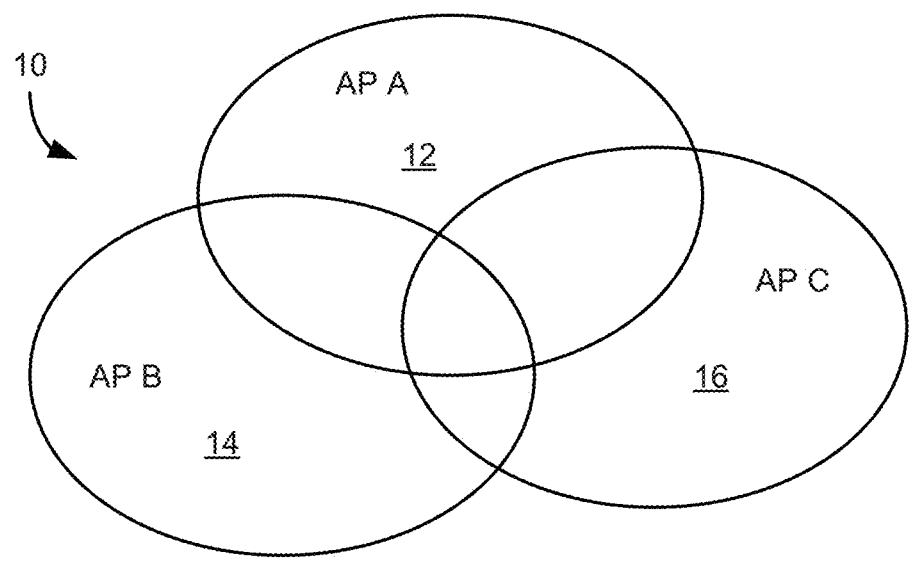
FIG. 1A shows a first system with several access points whose ranges overlap each other.

As noted previously, congestion in wireless networks is a common problem, particularly where multiple access points in proximity to each other broadcast signals in respective frequency bands that overlap each other. FIG. 1A, for example, shows a wireless network 10 including three access points 12, 14, and 16 where each access point broadcasts over a transmission area overlapping that of other access points. Typically, each of the access points 12, 14, and 16 will need to select a channel within which it will route transmissions, and broadcast its selected transmission channel over a beacon to its potential client devices. The client devices could include, but are not limited to, personal computers, laptop computers, cell phone, Internet of Things (IoT) devices, etc. The width of the channel may depend on the frequency at which the respective AP operates; in the 2.4 GHz band, an AP may choose a channel that is either 20 MHz wide or 40 MHz wide, centered on a selective one of several standardized frequencies (called center frequencies) set by the applicable jurisdiction. In the 5 GHz band, an AP may choose a channel width that is either 20 MHz, 40 MHz, 80 MHz, 160 MHz, or 80+80 MHz (two discontinuous channels, each of 80 MHz width), again centered on a selective one of several standardized frequencies. In the example of FIG. 1A, each AP 12, 14, and 16 operates over an 80 MHz channel.

Figure 1B:
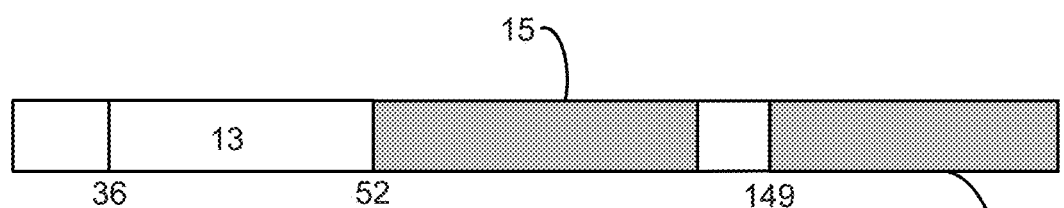
FIG. 1B shows an exemplary channel assignment for the access points of FIG. 1A under ideal channel conditions.
Figure 1C:
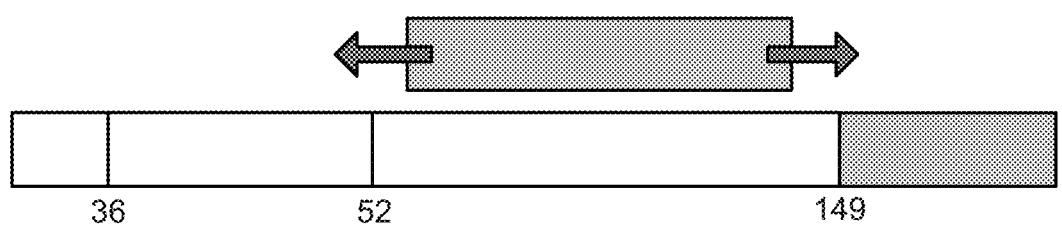
FIG. 1C shows a second exemplary channel assignment for the access points of FIG. 1A under non-ideal channel conditions.

To select their respective operating channels, each AP 12, 14, and 16 listens to a channel or channels over which it is interested in communicating, either in real time or by calculating the end of an earlier message, and attempts to seize the channel contending with any other devices that also want to seize the channel. FIG. 1B shows an ideal circumstance where each AP 12, 14, and 16 is able to select a unique channel in the 5 GHz band without overlapping into each other's channels, i.e. AP 12 selects a 80 MHz channel 13, AP 14 selects a 80 MHz channel 15 and AP 16 selects a 80 MHz channel 17. This ideal circumstance would only exist, however, if there is no Dynamic Frequency Selection (DFS) interference. FIG. 1C shows a circumstance where such interference exists, and AP 14 must migrate to a channel that overlaps that of AP 12, or AP 16, or both. An intelligent algorithm within AP 14 might try to use a different priority primary channel or seek the least used band, but in any circumstance either or both of AP 12 and AP 16 will be affected by either an increase in contention time or a decrease in channel size.

Though in the examples shown in FIGS. 1A-1C, each AP 12, 14, and 16 uses the 5 GHz band, the same constraints apply with at least as much effect to the 2.4 GHz band because its widest channel is 40 MHz. Moreover, channel conflicts between access points may be further exacerbated where an access point seizes an 80 MHz channel, but the client devices that later connect to it only require 20 MHz, for example.

Figure 2A:
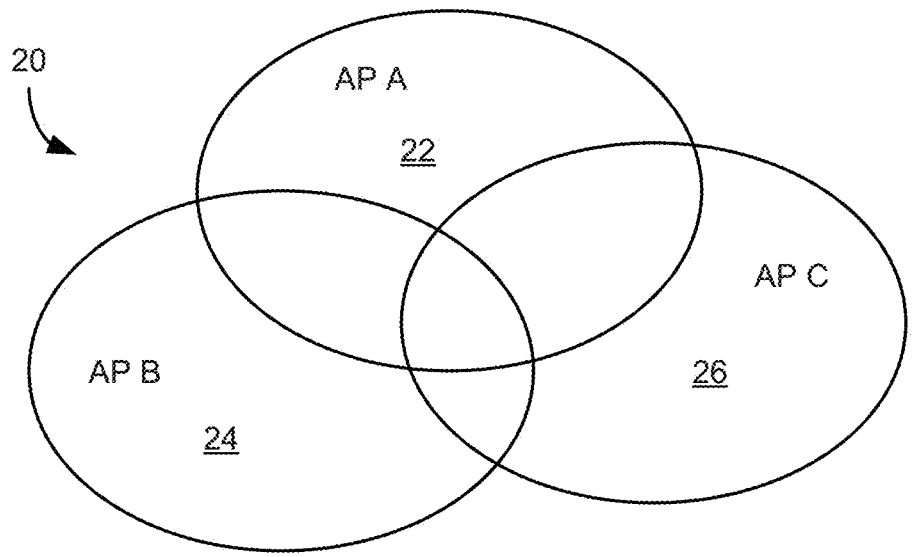
FIG. 2A shows a second system with several access points whose ranges overlap each other, where at least two access points share a wide channel.
Figure 2B:
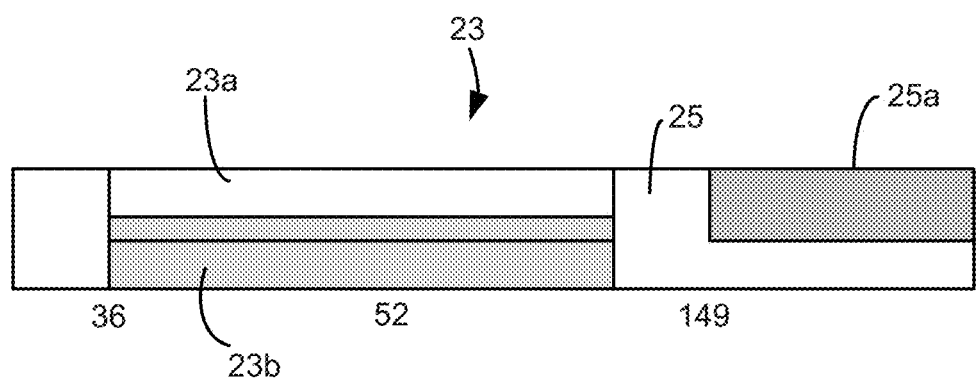
FIG. 2B shows an exemplary channel assignment for the system of FIG. 2A.

Referring to FIGS. 2A and 2B, an improved wireless network 20 may include AP 22, AP 24, and AP 26. Like the wireless network 10 of FIG. 1A, the APs 20, 22, and 24 each individually desire an 80 MHz channel over which communications of client devices are relayed, within the 5 GHz band. Unlike the wireless network 10, however, instead of simply listening in on channel(s) that the APs desire to seize, and seizing an available channel of a desired width as the opportunity arises, the APs 22, 24, and 26 communicate among themselves either directly or indirectly to determine the width of the channel that each AP broadcasts on its beacon, as well as the location of those channels and the locations of the primary channels used by the respective APs 22, 24, and 26. Stated differently, each AP 22, 24, and 26 may selectively choose the location, width, and other properties of the channel over which it communicates data to, from, and among its clients using information received either directly or indirectly from other APs in its vicinity, and preferably so that at least two of the APs coordinate to share a wider 160 MHz channel 23.

For example, as shown in FIG. 2B, the communications 23a of AP 22 may be transmitted over the 160 MHz channel beginning at channel 36 while the communications 23b of AP 24 may also be transmitted over the 160 MHz channel beginning at channel 36. Within the shared channel 23, AP 22 may for example, advertise channel 36 as its 20 MHz primary channel while AP 24 may advertise channel 52 as its 20 MHz primary channel, though those of ordinary skill in the art will appreciate that other 20 MHz bands within the larger 160 MHz channel may be selected as primary channels for the APs sharing the larger channel. AP 26, conversely, may transmit its communications 25a over its own dedicated 80 MHz channel starting at channel 149.

Those of ordinary skill in the art will appreciate that, although the APs 22, 24, and 26 transmit in the 5 GHz band, the APs may also transmit in the 2.4 GHz band, and at smaller frequency widths. Similarly, in some wireless networks, it may be most beneficial for different numbers of APs to share a wider band. For example, four APs may share a 160 MHz channel while two APs share a 40 MHz channel, all within the 5 GHz band.

In addition to cooperatively assigning the location, width, and other properties of the channels over which APs 22, 24, and 26 communicate, the APs 22, 24, and 26 may also each use information received from other APs, either directly or indirectly, to divide bandwidth among each AP's clients, or to otherwise manage network traffic by cooperatively assigning Resource Units (RUs) among APs and their clients. A Resource Unit (RU) may be defined as the smallest subdivision of bandwidth within a channel in a wireless network. Thus, for example, channel 23 may be subdivided into RUs and each AP might instruct specific client devices to use specific RUs such that these devices use only 5 MHz of the larger 160 MHz channel, so as to facilitate a transmission of another AP sharing that larger channel. Also, legacy devices may be instructed that an AP is using a specific 20 MHz band within the larger 160 MHz channel, while the AP uses the RUs of the remaining bandwidth for non-legacy client devices.

Thus, as can easily be appreciated, sharing a larger channel such as channel 23 of FIG. 2A allows more efficient use of network bandwidth; if a client device of AP 22 could support a 160 MHz wide transmission, AP 22 could temporarily reserve the entire bandwidth of the channel for that transmission during periods where AP 24 is not transmitting data. Similarly, if both AP 22 and AP 24 are both actively transmitting, some portion of the 160 MHz channel could be allocated to AP 22 and the remaining non-overlapping portion allocated to AP 24. This allocation could be adjusted dynamically based on statistics contemporaneously analysed regarding the transmission behavior of the clients of AP 22 and AP 24.

Figure 3:
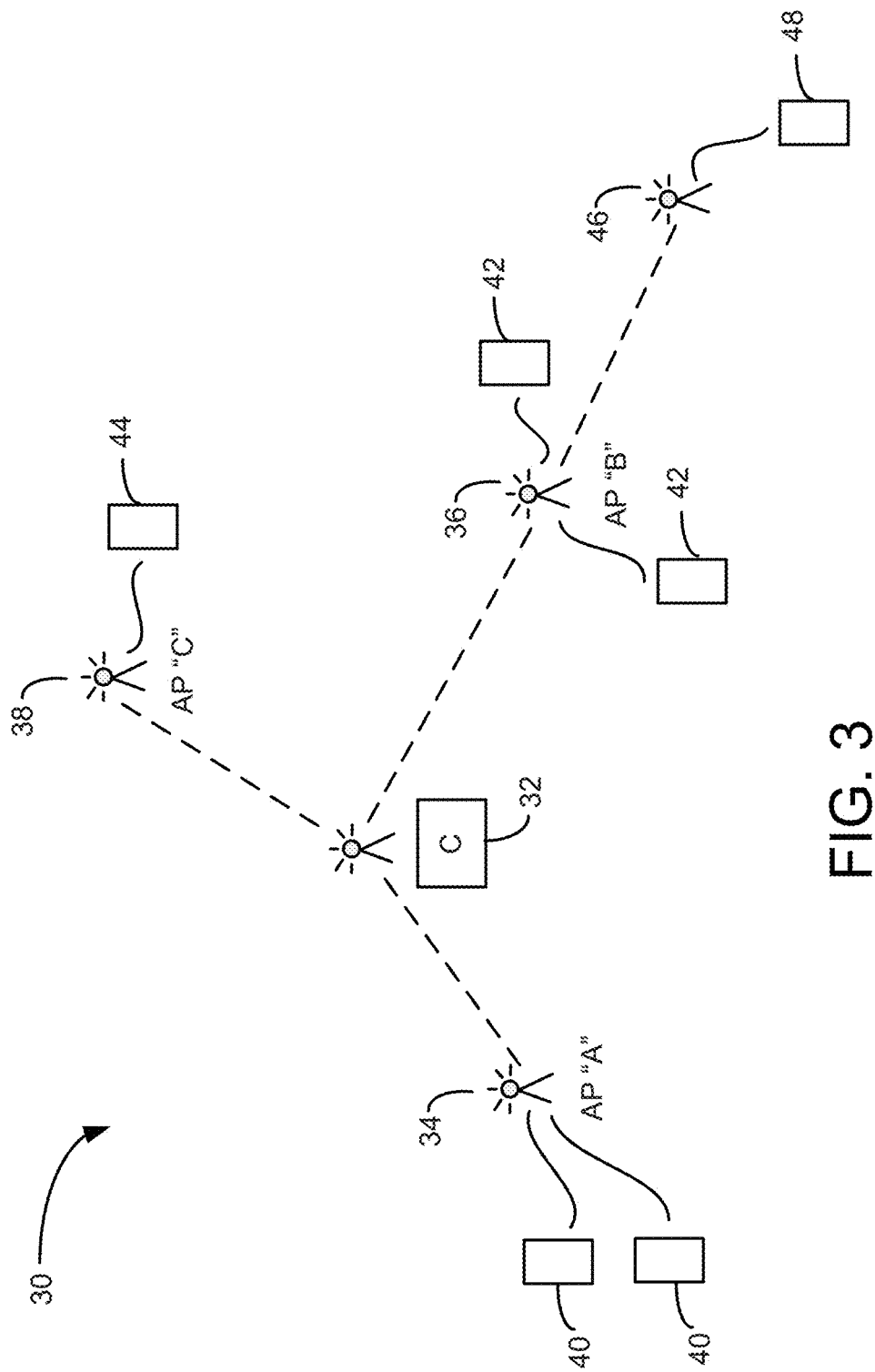
FIG. 3 shows the system of FIG. 2A implemented using a central controller.

The wireless network 20 of FIG. 2A may be implemented in any of a plurality of architectures or systems. Referring to FIG. 3, for example, a system 30 may comprise a central controller 32 that communicates with each of a plurality of APs 34, 36, and 38. Each AP 34, 36, and 38 hosts communications from its own client devices. For example, AP 34 hosts communications from client devices 40, AP 36 hosts communications from client devices 42, while AP 38 hosts communications from one or more client devices 44. Each AP may include a transmitter and a receiver to selectively transmit and receive data to and from its client devices, the controller 32, and/or other APs. In some embodiments, a single transceiver may operate as both the transmitter and receiver.

The controller 32 also may include a transmitter and a receiver to selectively transmit and receive data to and from the APs 34, 36, and 38, and in some embodiments their client devices. In some embodiments, a single transceiver may operate as both the transmitter and receiver. The controller 32 may selectively receive information from each of the APs 34, 36, and 38 and use that information to initially assign channels to the respective APs, which may involve assigning unique channels to each of the APs 34, 36, and 38, but may in some instances include assigning a shared larger channel to multiple APs as previously described, and/or may include channel assignments that otherwise overlap. In addition, the controller 32 may monitor and accumulate statistical information on the behavior of the APs 34, 36, and 38 and/or the client devices hosted by such APs. In some embodiments, the APs 34, 36, and 38 may also communicate information about other APs that they detect individually, but that are not part of the network 30 controlled by the controller 32. For example, AP 36 in FIG. 3 may detect AP 46 that hosts its own one or more client devices 48 and may communicate the existence of that AP to the controller 32 as well as any additional information the AP 36 may detect regarding AP 46. The controller 32 may in turn use that information when assigning channels etc. so as not to adversely affect the performance of AP 46.

Figure 4:
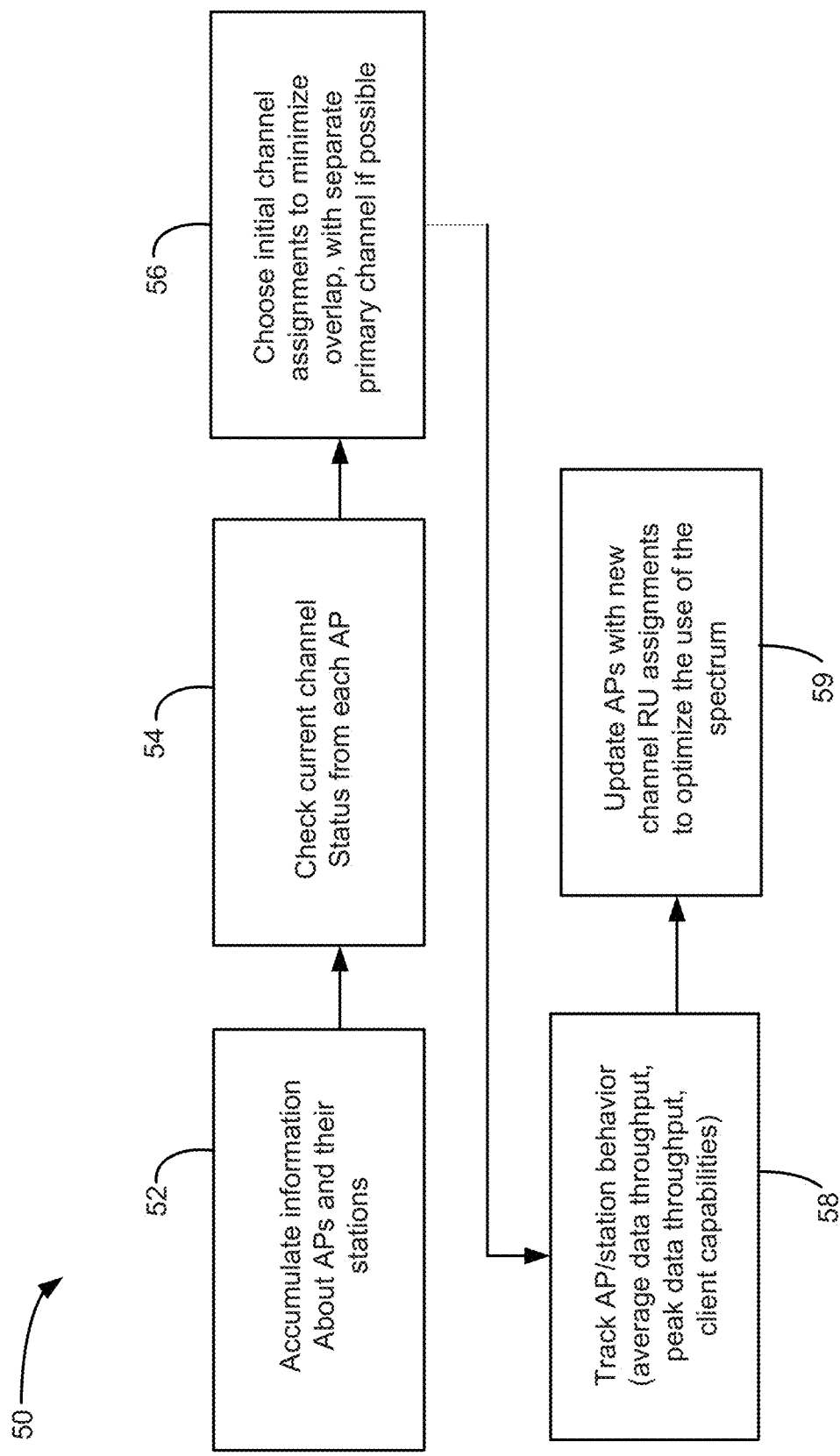
FIG. 4 shows an exemplary method used by the central controller of FIG. 3.

FIG. 4 shows an exemplary method 50 that controller 32 uses to control the wireless network 30. In step 52, the controller 32 accumulates information about APs within range (e.g., APs 34, 36, and 38 of FIG. 3) and the stations that each respectively hosts, as well as any available information about APs not in range of the controller, but in range of APs transmitting to the controller, which may relay such information to the controller 32. Each AP may communicate with a URL well-known to member of the controller's group of APs that would allow the controller to (directly or indirectly) learn about new APs. Alternatively, the controller 32 may advertise its own URL and each AP in range may be configured to use that URL to initiate communications with the controller 32. In one embodiment, the URL could be broadcast within a beacon of the controller. As each AP gains and/or loses client devices, this information may be communicated or relayed to the controller 32 in an update message, allowing the controller to monitor the background load generated by the collection of client devices.

In step 54, the controller 32 checks the current channel status from each AP. In some embodiments, each AP 34, 36, 38, etc. may be capable of scanning for beacons of other APs across all supported bands and reporting such compiled information (e.g., power levels of detected APs, etc.) so that the controller 32 compiles as complete information as possible about APs that may be affected by its control of network 30. The APs may also be capable of reporting the degree of usage or congestion of the band(s) they currently occupy, and well as the degree of usage or congestion of other bands.

In step 56 the controller 32 chooses initial channel assignments for APs with which it is in direct communication, e.g., APs 34, 36, and 38, including assignment of 20 MHz primary channels for each AP. Preferably the chosen channel assignments minimize overlapping channels between APs. Although even primary channels are permitted to overlap, non-overlapping primary channels permit legacy APs that cannot be controlled by the controller 32 to broadcast with minimized contention, since they will simply remain on the 20 MHz primary channel that they joined. If a legacy AP broadcasts a channel larger than 20 MHz on its beacon, its peak throughput will be higher, but its overall throughput may be lower due to contention with other APs, given the all-or-nothing nature of each transmission opportunity for legacy devices.

In step 58 the controller 32 tracks the behavior of APs with which it is in direct or indirect communication, e.g., APs 34, 36, 38, and 48. Such behavior may include, but is not limited to, average data throughput, peak data throughput, and client capabilities. Each AP can report the behavior of their client devices to the controller 32 as they interact with those client devices. If the client devices can perform neighbor report functions, then that information may in some embodiments be used by the controller 32 to determine which RUs within a channel may be allocated to client devices so as to minimize contention.

In step 59, the controller updates each AP with which the controller is in direct communication with new channel/RU assignments to optimize use of the band shared by the APs over a predefined future period of time and according to one or more predefined criteria. In some embodiments the controller predicts future behavior of client devices and/or APs by assuming that a client device's current behavior will continue for at least a few seconds, and based on that predicted behavior selects an optimum combination of channel/RU assignments. Some factors that could be used to determine an "optimum" allocation in various embodiments include: average bytes transmitted per client in the last measurement interval, average MCS (modulation and coding scheme) of each client in the last measurement interval, queue depth within each AP, and quality of service commitments for any clients. The optimization algorithm could optimize for least latency by minimizing queue depth on each AP. Alternatively, the optimization algorithm could optimize for greatest channel throughput by favoring AP/client transmission with the best average MCS. Other channel use optimization approaches would occur to those skilled in the art and could be used in this architecture.

In some embodiments, if each AP with which the controller is in direct communication cannot occupy its own unique channel, the controller 32 may selectively assign two or more APs to share a larger channel as previously described, either in an initial or updated channel assignment. The controller 32 may use statistical data gathered from APs/client devices to make such an assignment. For instance, a Netflix or other streaming media client of an AP will tend to periodically receive large bursts of data with quiet periods, while a gaming client of an AP may have frequent bursts of small amounts of data. This behavior should be reflected in the statistical information collected by the controller 32, which may elect to have the two APs serving these clients divide up a larger channel, assigning the gaming client a small RU within the larger channel to accommodate the frequent small bursts of data, while the Netflix client may use the remainder of the large channel to maximize its throughput during the sporadic periods when it needs to receive a large burst.

Similarly, the controller 32 may attempt to allocate enough RUs in frequency and time to allow both low latency client devices and high bandwidth client devices to achieve their bandwidth demands. However, there will sometimes not be enough bandwidth to accommodate all client devices simultaneously, and the controller 32 will have to divide the RUs as equitably as possible, spreading the effects of congestion across all the APs.

Figure 5:
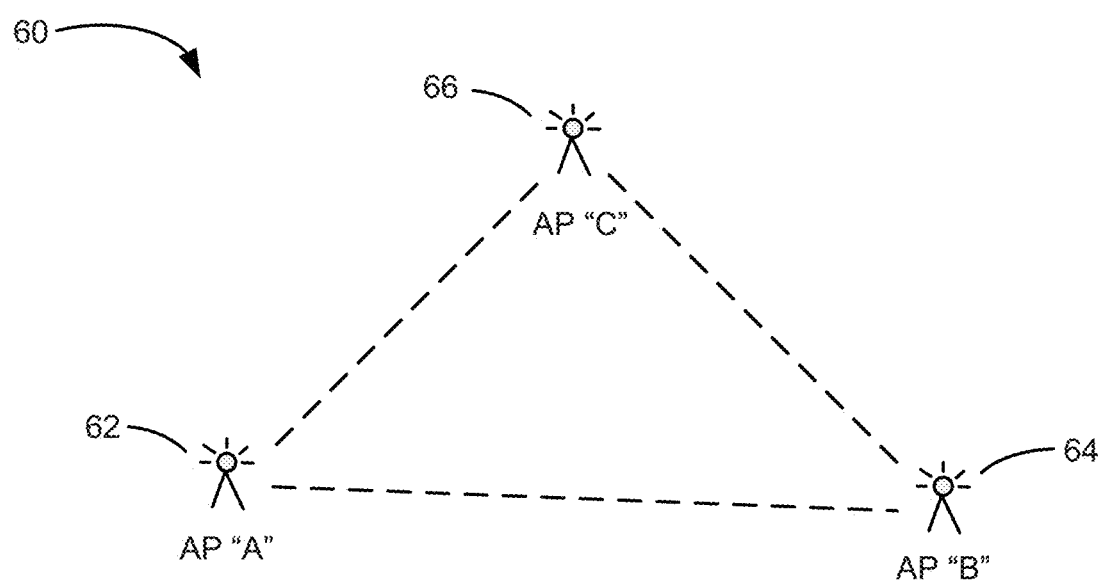
FIG. 5 shows an ad-hoc network of access points that implement the system of FIG. 2A.

FIG. 5 shows an alternate architecture or system in which an ad-hoc network 60 of APs implement the wireless network 20 of FIG. 2. Specifically, the ad-hoc network 60 may include APs 62, 64, and 66 that each communicate with each other to accumulate information about each other and their respective clients, and based on that information cooperatively select channels (and primary channels) to broadcast over their respective beacons, and cooperatively allocate RUs within channels, etc. Each AP preferably includes a transmitter and a receiver to selectively transmit and receive data to and from its client devices, the controller, and/or other APs. In some embodiments, a single transceiver may operate as both the transmitter and receiver. Each AP 62, 64, and 66 may broadcast in its respective beacon not only information about the channel over which it communicates, but an identifier indicating its ability to coordinate with other APs in cooperatively assigning channels and RUs within channels.

Figure 6:
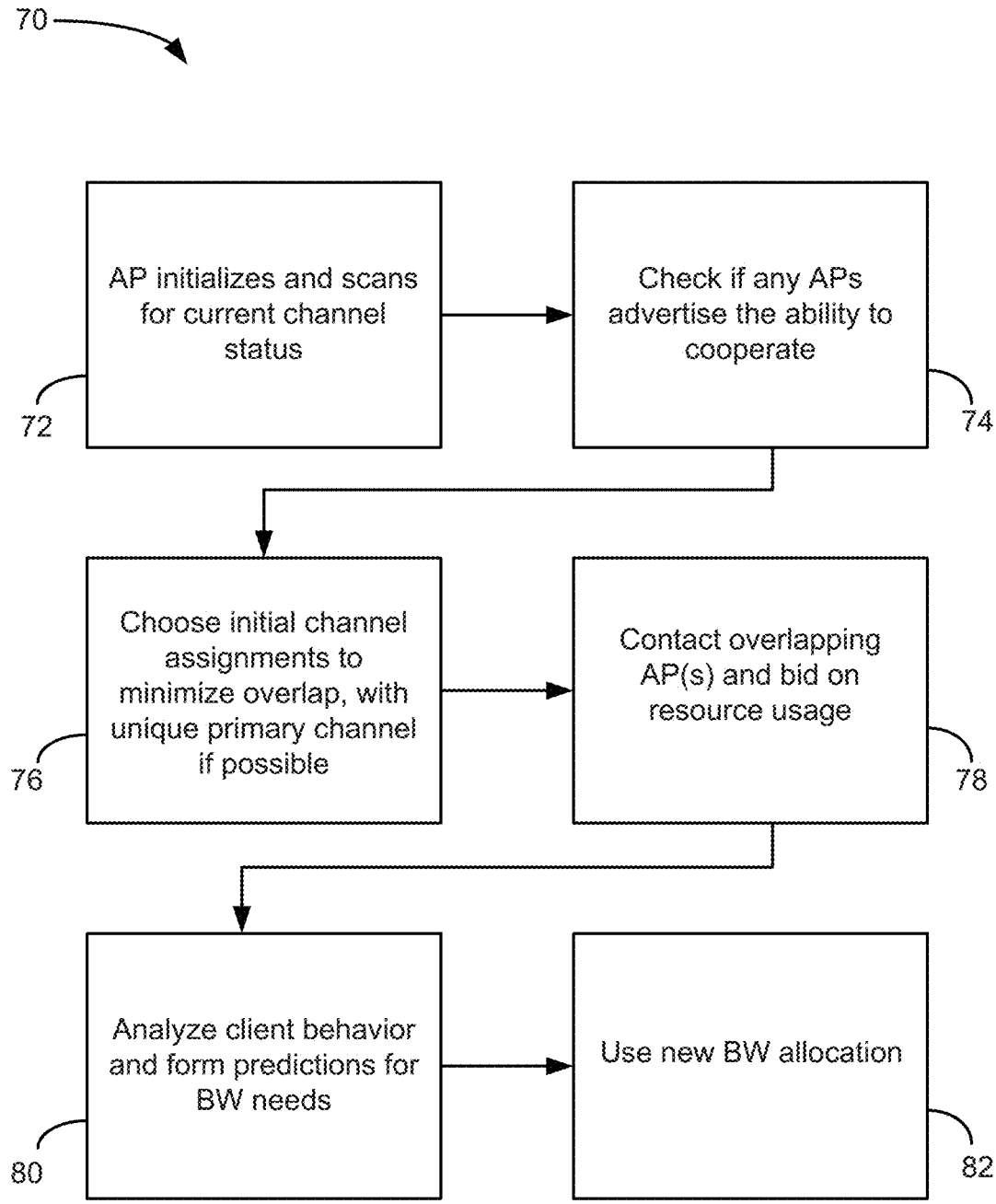
FIG. 6 shows an exemplary method used by an access point of the system of FIG. 5.

FIG. 6 shows an exemplary method 70 that each AP 62, 64, 66 uses to operate within the wireless network 60. In step 72 each AP scans for the current status of each channel over which it is capable of broadcasting. In step 74, each AP also detects beacons of other APs within range and whether those APs advertise the ability to cooperate.

In step 76, each AP 62, 64, 66 cooperatively choose initial channel assignments to minimize overlap, with unique primary channel assignments if possible. If no other AP advertises the ability to cooperate, then the AP may select the band with the lowest utilization according to any one of several known algorithms. If there are other APs capable of cooperation, then the AP may determine if there is an unused band, and select it as an initial channel assignment if it exists. If there are no unused bands, the AP may select a band used by another cooperating AP, and with the least utilization. The AP may then select any available non-overlapping primary channel within the selected band.

In step 78, each AP contacts cooperating, overlapping APs and pre-bids on resource usage for the next sequential, upcoming transmission cycle until agreement is reached. In one embodiment, each AP bids on the minimum resources needed for the next sequential transmission cycle, initially selecting random RUs. If no RUs being bid upon conflict, then the bids are accepted and usage begins. If bids on RUs overlap, the last bidder(s) retract their bids and submit new bids on unused RUs. If there are no unused RUs, the losing APs reduce their bidding timers and bid earlier during the next sequential transmission cycle, thus increasing their likelihood of successfully bidding on the needed number of RUs. This method reduces overall latency since the bidding process does not happen in real time but in the background while the current transmission cycle is ongoing. Those of ordinary skill in the art will appreciate, however, that other contention algorithms are feasible. The communication channel between the APs may be wireless, but preferentially may make use of the APs' wired connections back onto the larger wide area network. The beacons sent by all APs may be used to broadcast information about coordination points, and security configurations.

In step 80, each cooperating AP analyses its own clients' behavior to predict future resource needs, which in some circumstances (such as heavy channel usage) may involve analyzing data in a queue for transmission. Where there is no traffic in a queue, the cooperating AP may analyze client behavior to discern predictable patterns that may repeat over periods ranging from less than a second to as many as 20 seconds. In step 82 each AP uses the new resource allocation, and then the procedure returns to step 72.

In some embodiments, two or more cooperating APs may coordinate to share a wider band as previously described, using the analysis of each AP's client's behavior, which may be communicated among cooperating APs. Thus, in such circumstances, cooperating APs may update the respective channels broadcast on their beacons to reflect such shared wider channels.

Those of ordinary skill in the art will appreciate that, although the systems shown in FIGS. 3-6 and described in the specification illustrate disclosed embodiments using three cooperating APs, this number is illustrative only, and other networks (either ad-hoc or using a controller) may include any number of cooperating APs. Those of ordinary skill in the art will also appreciate that other architectures for implementing the system of FIG. 2A are also possible, including for example, an ad-hoc network where one of the APs acts as a master controller for other APs in the wireless network, etc.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of a plurality of access points of a wireless network, the method comprising:
   scanning by each of the plurality of access points for a current status of each channel over which each of the plurality of access points broadcasts on;
   cooperatively choosing by each of the plurality of access points initial channel assignments for each of the plurality of access points that advertise an ability to cooperate to share respective channel assignments, at least one of said initial channel assignments having a channel width that depends on whether it is shared;
   contacting by each of the plurality of access points cooperating, overlapping one or more access points of the plurality of access points;
   bidding by each of the plurality of access points on resource usage of the contacted cooperating, overlapping one or more access points for a next sequential, upcoming transmission cycle until an agreement is reached while a current transmission cycle is ongoing; and
   beginning resource usage based on the agreement.

2. The method of claim 1, wherein the bidding comprises initially selecting random one or more resource units.

3. The method of claim 2, wherein the one or more resource units overlap and wherein the bidding comprises:
   retracting by one or more last bidders of the plurality of access points the bidding; and
   submitting by the one or more last bidders one or more new bids on one or more unused resource units.

4. The method of claim 2, wherein the one or more resource units overlap, wherein there are no one or more unused resource units, and wherein the bidding comprises:
   retracting by one or more last bidders of the plurality of access points the bidding; and
   the one or more last bidders of the plurality of access points reduce one or more bidding timers so as to bid earlier during a next sequential transmission cycle.

5. The method of claim 1, further comprising:
   analyzing by each of the cooperating, overlapping one or more access points of the plurality of access points behavior of one or more client devices; and
   predicting one or more future resource needs based on the analyzing.

6. The method of claim 5, further comprising:
   coordinating by at least two or more of the cooperating, overlapping one or more access points to share a wider band based on the analyzing; and
   updating one or more respective channels broadcast on the at least two or more of the cooperating, overlapping one or more access point beacons to reflect the shared wider band.

7. The method of claim 5, wherein the analyzing comprises analyzing data in a queue for transmission.

8. The method of claim 5, wherein the analyzing comprises discerning predictable patterns that repeat.

9. The method of claim 1, further comprising:
   detecting by each of the plurality of access points beacons of one or more other access points within range and whether the one or more other access points advertise an ability to cooperate.

10. The method of claim 1, wherein the initial channel assignments are unique primary channel assignments.

11. The method of claim 1, wherein cooperatively choosing comprises:
    determining by at least one of the plurality of access points that an unused band exists;
    selecting by at least one of the plurality of access points the unused band as an initial channel assignment of the initial channel assignments.

12. The method of claim 1, wherein cooperatively choosing comprises:
    determining by at least one of the plurality of access points that an unused band does not exist;
    selecting by at least one of the plurality of access points a band used by another cooperating, overlapping one or more access points.

13. The method of claim 12, wherein the selecting band used by another cooperating, overlapping one or more access points is one with least utilization.

14. The method of claim 1, wherein at least one of the plurality of access points is a master controller.

* * * * *